(12) United States Patent
Gilb et al.

(10) Patent No.: US 12,479,583 B2
(45) Date of Patent: Nov. 25, 2025

(54) AIR DATA PROBE ELECTRONICS HOUSING WITH RETENTION FEATURES

(71) Applicant: Rosemount Aerospace Inc., Burnsville, MN (US)

(72) Inventors: Andrew Gilb, New Prague, MN (US); Rudy L Pitera, Inver Grove Heights, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 623 days.

(21) Appl. No.: 17/811,721

(22) Filed: Jul. 11, 2022

(65) Prior Publication Data

US 2024/0010343 A1 Jan. 11, 2024

(51) Int. Cl.
*B64D 15/12* (2006.01)
*B64D 15/20* (2006.01)
*G01K 13/02* (2021.01)

(52) U.S. Cl.
CPC ............. *B64D 15/12* (2013.01); *B64D 15/20* (2013.01); *G01K 13/028* (2013.01)

(58) Field of Classification Search
CPC ...... G01K 13/028; G01K 13/02; G01K 11/00; G01K 17/10; G01K 11/20; G01K 13/026; B64D 15/20; B64D 15/12; B64D 43/02
See application file for complete search history.

(56) References Cited

U.S. PATENT DOCUMENTS

| | | | |
|---|---|---|---|
| 4,121,088 A | 10/1978 | Doremus et al. | |
| 5,653,538 A * | 8/1997 | Phillips | G01K 13/02 374/138 |
| 2003/0058919 A1* | 3/2003 | Ice | G01K 13/028 374/138 |
| 2007/0220984 A1* | 9/2007 | Slagle | G01P 5/16 374/E13.006 |
| 2010/0116047 A1* | 5/2010 | Severson | B64D 15/20 73/29.01 |
| 2013/0022076 A1* | 1/2013 | Dijon | G01K 13/02 374/138 |
| 2014/0050247 A1* | 2/2014 | Herman | G01K 13/028 374/138 |

(Continued)

FOREIGN PATENT DOCUMENTS

| | | | | |
|---|---|---|---|---|
| CA | 3046753 A1 | * | 12/2019 | ........... G01K 13/028 |
| EP | 3766783 A1 | | 1/2021 | |
| WO | 2020155175 A1 | | 8/2020 | |

OTHER PUBLICATIONS

17811721_2024-12-27_CA_3046753_A1_H.pdf,Dec. 15, 2019.*
Extended European Search Report for EP Application No. 23184870.6, Dated Nov. 2, 2023, pp. 7.

*Primary Examiner* — Peter J Macchiarolo
(74) *Attorney, Agent, or Firm* — Kinney & Lange, P.A.

(57) ABSTRACT

In some applications, aircraft air data probes are heated to prevent rain, ice, or other moisture from attaching to the air data probe. The body of the air data probe and the components positioned within the body of the air data probe can be constructed from differing materials, resulting in differing coefficient of thermal expansions for each component. Retention features are added to a housing to prevent an epoxy potting from expanding outside its intended region and preventing damage to the electronic components within the housing.

19 Claims, 5 Drawing Sheets

(56) References Cited

U.S. PATENT DOCUMENTS

| | | | |
|---|---|---|---|
| 2014/0169401 A1* | 6/2014 | Schwie | G01K 13/028 |
| | | | 374/100 |
| 2020/0041352 A1* | 2/2020 | Ashton | G01K 13/02 |
| 2021/0022215 A1* | 1/2021 | Jacob | G01F 1/46 |
| 2021/0223279 A1* | 7/2021 | DeGroff | G01P 5/165 |
| 2022/0118683 A1 | 4/2022 | Wigen et al. | |
| 2024/0010344 A1* | 1/2024 | Gilb | B64D 43/02 |

* cited by examiner

AIR DATA PROBE ELECTRONICS HOUSING WITH RETENTION FEATURES

BACKGROUND

The present disclosure relates generally to air data probes on an aircraft, and more particularly to an air data probe electronics housing with retention features.

Some aircraft air data probes are heated to prevent rain, ice, or other moisture from attaching to the probe, which could negatively impact the functionality of the air data probe. In many cases, the heat is elevated to extremely hot temperatures to ensure there is no ice accretion on the air data probe during flight of the aircraft. However, there are materials and components within the air data probes in which excess heat is detrimental. As such, there is a need for preventing damage to the materials and components positioned within the heated air data probes.

SUMMARY

According to one aspect of the disclosure, an air data probe is disclosed. The air data probe includes a body including an inlet fluidly coupled to an outlet. A heating element is positioned within the body of the air data probe, and the heating element is configured to increase a temperature of the body. A sensing probe is positioned within the body, and the sensing probe includes a sensing base coupling the sensing probe to the body. A housing is positioned within and coupled to the body. The housing includes a housing body including an upper surface, a lower surface, an inner surface, and an outer surface. Further, the housing includes a plurality of retention features positioned within the housing body. Each of the plurality of retention features extend from the inner surface of the housing towards a central axis of the housing.

According to another aspect of the disclosure, a housing for surrounding electrical components within an air data probe configured to gather data during flight of an aircraft is disclosed. The housing includes a housing body including an upper surface, a lower surface, an inner surface, an outer surface, a rim positioned adjacent the upper surface, and a lower body positioned adjacent the lower surface. Further, the housing includes a plurality of retention features positioned within the housing body. Each of the plurality of retention features extend from the inner surface of the housing towards a central axis of the housing.

DETAILED DESCRIPTION

Figure 1A:
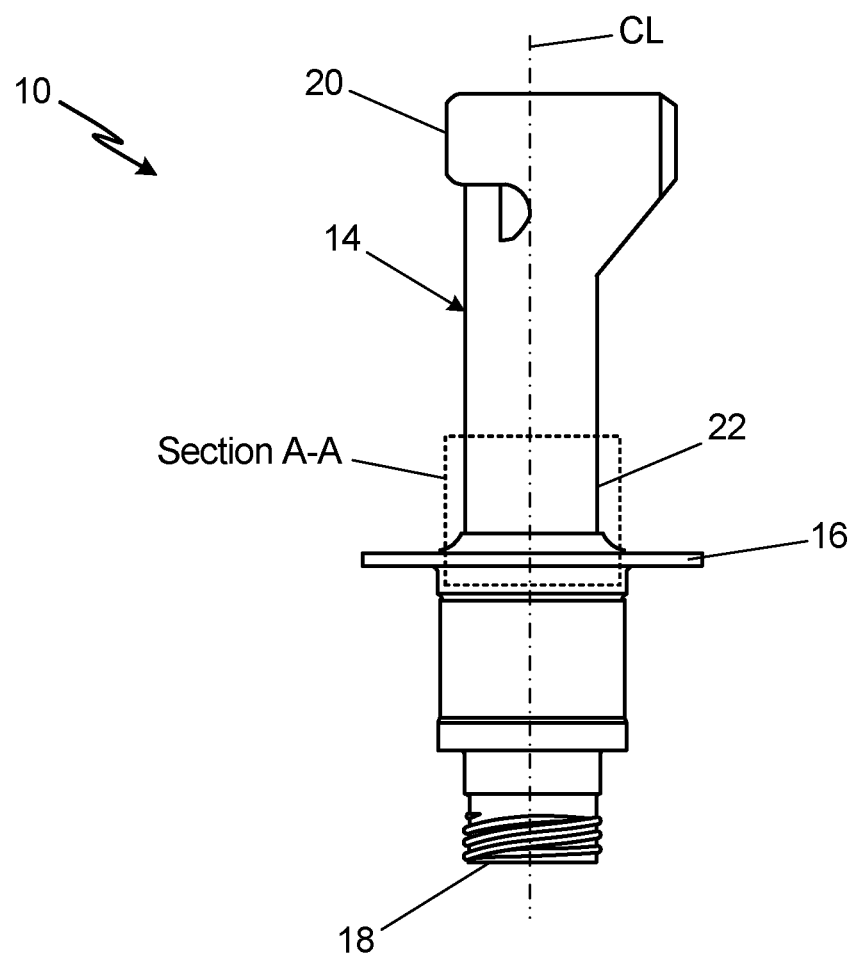
FIG. 1A is a side view of an exemplary air data probe used on an aircraft.
Figure 1B:
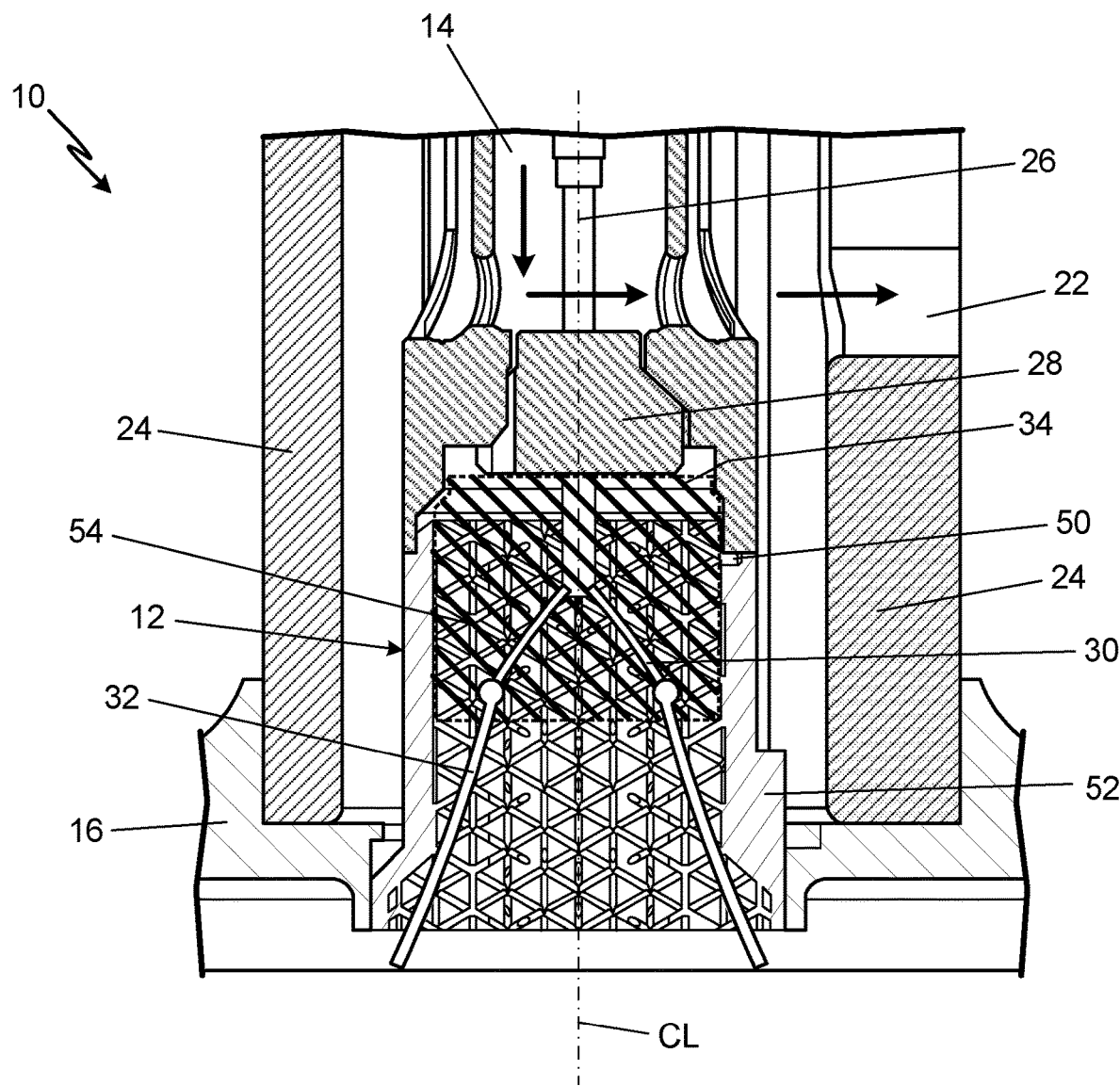
FIG. 1B is a partial cross-sectional view of a housing within the exemplary air data probe taken along Section A-A of FIG. 1A.

FIG. 1A is a side view of air data probe 10 used on an aircraft (not shown). FIG. 1B is a partial cross-sectional view of housing 12 positioned within air data probe 10 taken along Section A-A of FIG. 1A. FIGS. 1A-1B will be discussed together. Further, hereinafter, air data probe 10 will be referred to as probe 10, but it is to be understood that probe 10 is referring to air data probe 10. Probe 10 is a device which detects or measures a physical property and records, initiates, or otherwise responds to the detected or measured physical property. In some examples, probe 10 can be used to detect the total air temperature, air pressure, air velocity, and/or air density, among other properties not specifically described, during flight of an aircraft. Further, in some examples, probe 10 can be positioned at the nose cone of an aircraft such that probe 10 is positioned partially within the skin of the aircraft and partially outside the skin of the aircraft.

Since a portion of probe 10 is positioned outside the skin of the aircraft, probe 10 can experience harsh operating conditions including, but not limited to low operating temperatures, ice, rain, sleet, snow, etc. In some examples, to ensure proper functionality of probe 10, probe 10 can be heated to prevent ice, rain, or other precipitation from accumulating on probe 10 during flight of the aircraft. Heating probe 10 can melt ice on probe 10, allowing the precipitation to blow off probe 10 during flight conditions. Further, heating probe 10 can facilitate evaporation of any precipitation on probe 10 during flight conditions. Probe 10 is configured to gather air data during flight of the aircraft, providing the pilots of the aircraft critical information during flight conditions. As such, it is important that probe 10 is functioning properly and providing the pilots of the aircraft accurate information.

Referring to FIG. 1A, probe 10 includes body 14, flange 16, electrical connector 18, inlet 20, and outlet 22. Body 14 is the main structure of probe 10 that protects the components within probe 10 from environmental conditions. In some examples, body 14 can be constructed from at least one metallic material. In other examples, body 14 can be constructed from a ceramic material, a polymeric material, and/or a composite material. With that said, the following discussion with focus on an embodiment in which body 14 is constructed from a metallic material. Body 14 includes inlet 20 positioned at a distal end of probe 10 and outlet 22 positioned generally at a central portion of probe 10. Inlet 20 is positioned at a first distal end of probe 10. More specifically, inlet 20 is positioned at the distal end of probe 10 positioned outside the skin of the aircraft. Inlet 20 can be an aperture extending through body 14, allowing air from outside the aircraft to enter and flow through inlet 20 into body 14. The air that flows through inlet 20 proceeds by flowing through body 14 and then exits body 14 by flowing outwards through outlet 22. Outlet 22 can be an aperture that extends through body 14, allowing air from within body 14 to flow out through outlet 22 to exit probe 10. In some examples, as shown, outlet 22 can be positioned generally at the central portion of probe 10 adjacent flange 16.

Flange 16 is positioned adjacent outlet 22 generally at a central portion of probe 10. Flange 16 extends outwards from the main portions of body 14 and flange 16 extends fully around an outer surface of body 14 of probe 10. As such, flange 16 is a flat rim or collar extending outwards from body 14 around an exterior of body 14. In some examples, flange 16 can have a circular cross-section viewing in the axial direction along probe 10. In other examples, flange 16 can have a cross-section of any geometric shape. Flange 16 is the feature of probe 10 that separates the portions of probe 10 positioned within and positioned outside the skin of an aircraft. More specifically, the portion of probe 10 including inlet 20 and outlet 22 is positioned on the outside of the skin of the aircraft and the portion of probe 10 including electrical connector 18 is positioned on the inside of the skin of the aircraft. Electrical connector 18 can be any electrical connector that creates and electrical connection between probe 10 and electronics on an aircraft. As shown in FIG. 1A, in some examples electrical connector 18 can include a threaded connection for securing probe 10 to an aircraft electrical system.

Referring to FIG. 1B, which is a partial cross-sectional view of probe 10 taken along Section A-A of FIG. 1A, probe 10 also includes heating element 24, sensing probe 26, sensing base 28, electrical wires 30, electrical leads 32, housing 12, and potting 34, each of which are positioned within body 14 of probe 10. In the example shown, probe 10 includes one heating element 24 wrapped around an outer surface of probe 10. In another example, probe 10 can include more than one heating element 24. In the example shown, heating element 24 is wrapped around an outer surface of probe 10 to facilitate melting of ice or evaporation of fluid on outer surfaces of probe 10. Heating element 24 can be an electrical resistance heating element that increase in temperature when an electrical current is transferred to the electrical resistance heating element. In some examples, heating element 24 can be electrical wires or electrical pads, among other options, which increase in temperature when an electrical current is transferred to heating element 24, such that heating element 24 increases the temperature of body 14.

Sensing probe 26 and sensing base 28 are components of probe 10 positioned within body 14 and generally aligned with a central axis of probe 10. Sensing probe 26 is the component of probe 10 which detects or measures a physical property of the air flowing through probe 10. More specifically, air from outside the aircraft flows through inlet 20 into body 14 and follows the flow path, indicated by the arrows in FIG. 1B, through body 14 to outlet 22. As such, the air flowing through probe 10 flows past sensing probe 26 within body 14 and sensing probe 26 can gather the desired data from the air flow before the air exits probe 10 through outlet 22. Sensing probe 26 is coupled to sensing base 28 to secure sensing probe 26 in a fixed position during operation of probe 10. Further, sensing base 28 is coupled to internal surfaces or features of body 14 to secure both sensing base 28 and sensing probe 26 in a fixed position during operation of probe 10 on an aircraft.

Electrical wires 30 are electrically coupled to and extend from a distal end of sensing probe 26 positioned within housing 12 of probe 10. Electrical wires 30 are configured to transfer data gathered by sensing probe 26 to an electrical system and/or a controller on an aircraft. More specifically, a plurality of electrical wires 30 are electrically coupled to a plurality of electrical leads 32, and the plurality of electrical leads 32 are coupled to electrical connector 18 of probe 10. As such, air data gathered by sensing probe 26 is transferred through electrical wires 30, through electrical leads 32, through electrical connector 18, and to an electrical controller system of an aircraft. Therefore, electrical wires 30, electrical leads 32, and electrical connector 18 allow the transfer of data from sensing probe 26 to an aircraft and breaking the electrical connection between any of the components can prevent the transfer of data from sensing probe 26 to an aircraft. As such, maintaining the electrical connection between electrical wires 30, electrical leads 32, and electrical connector 18 is critical to maintaining proper functioning of probe 10.

Housing 12 is positioned within body 14 of probe 10 and housing 12 is coupled to body 14 of probe 10. In some examples, housing 12 can be coupled to internal surfaces or features of body 14 through a welded connection. As such, in some examples, housing 12 can be constructed from a metallic material. In other examples, housing 12 can be constructed from a non-metallic material and housing 12 can be coupled to body 14 through an adhesive, a mechanical feature, or a fastener, among other options. Further, in some examples, housing 12 can be axially aligned with a central axis of probe 10. Therefore, in some examples, housing 12 can be positioned concentric with body 14 of probe 10. Housing 12 is fixedly positioned within body 14 of probe 10 and adjacent sensing base 28 of probe 10. Further, housing 12 is positioned such that housing 12 surrounds the plurality of electrical wires 30 extending from sensing probe 26. More specifically, housing 12 is positioned such that housing 12 surrounds a connection point between the plurality of electrical wires 30 and the plurality of electrical leads 32 such that the plurality of electrical wires 30 and the plurality of electrical leads 32 extend within a center opening within housing 12. In addition, the connection point between the plurality of electrical wires 30 and the plurality of electrical leads 32 is encompassed by potting 34.

Potting 34 is positioned within an inner surface of housing 12 and potting 34 is positioned adjacent an upper surface of housing 12. In some examples, as shown in FIG. 1B, potting 34 extends only a partial distance from an upper surface of housing 12 towards a lower surface of housing 12. In other examples, potting 34 can extend a full distance from an upper surface of housing 12 to a lower surface of housing 12. Further, potting 34 can encompass and fully surround the connection point between the plurality of electrical wires 30 and the plurality of electrical leads 32. As such, potting 34 is configured to aid in securing the connection between the plurality of electrical wires 30 and the plurality of electrical leads 32. In some examples, potting 34 can provide vibration support to the plurality of electrical wires 30 and the plurality of electrical leads 32, and potting 34 can act as an electrical isolator between the plurality of electrical wires 30, the plurality of electrical leads 32, and housing 12. In some examples, potting 34 can be constructed from a high-temperature epoxy material, such that potting 34 is introduced into housing 12 as a fluid and then solidifies to produce the vibration support and electrical isolation.

Although potting 34 can be constructed from a high-temperature epoxy material, the heat produced by heating element 24 of probe 10 can have undesirable effects on potting 34. For example, some high-temperature epoxy materials are designed to prevent melting under high temperatures, but if a high enough temperature is reached the high-temperature epoxy material could crack due to its brittle material properties. Further, potting 34 is likely to have different material properties than the metallic components surrounding potting 34, such as housing 12 and body 14 of probe 10. Therefore, potting 34 is likely to have a different coefficient of thermal expansion than housing 12 and when heat is applied to housing 12 and potting 34, the components will expand at differing rates. High-temperature epoxy material generally expand at a greater rate than metallic materials due when heat is applied to the components. As such, when heat is applied to potting 34 and housing 12, potting 34 can expand at a greater rate than housing 12 which can cause potting 34 to expand outside its intended adhesion area. In some scenarios, potting 34 can expand to an extent that it pulls apart and breaks the connection between the plurality of electrical wires 30 and the plurality of electrical leads 32. In turn, this can sever the electrical connection between probe 10 and an aircraft, preventing data from transferring from probe 10 to the aircraft. To remedy this potential issue, housing 12 includes features preventing damage to the plurality of electrical wires 30 and the plurality of electrical leads 32.

Figure 2A:
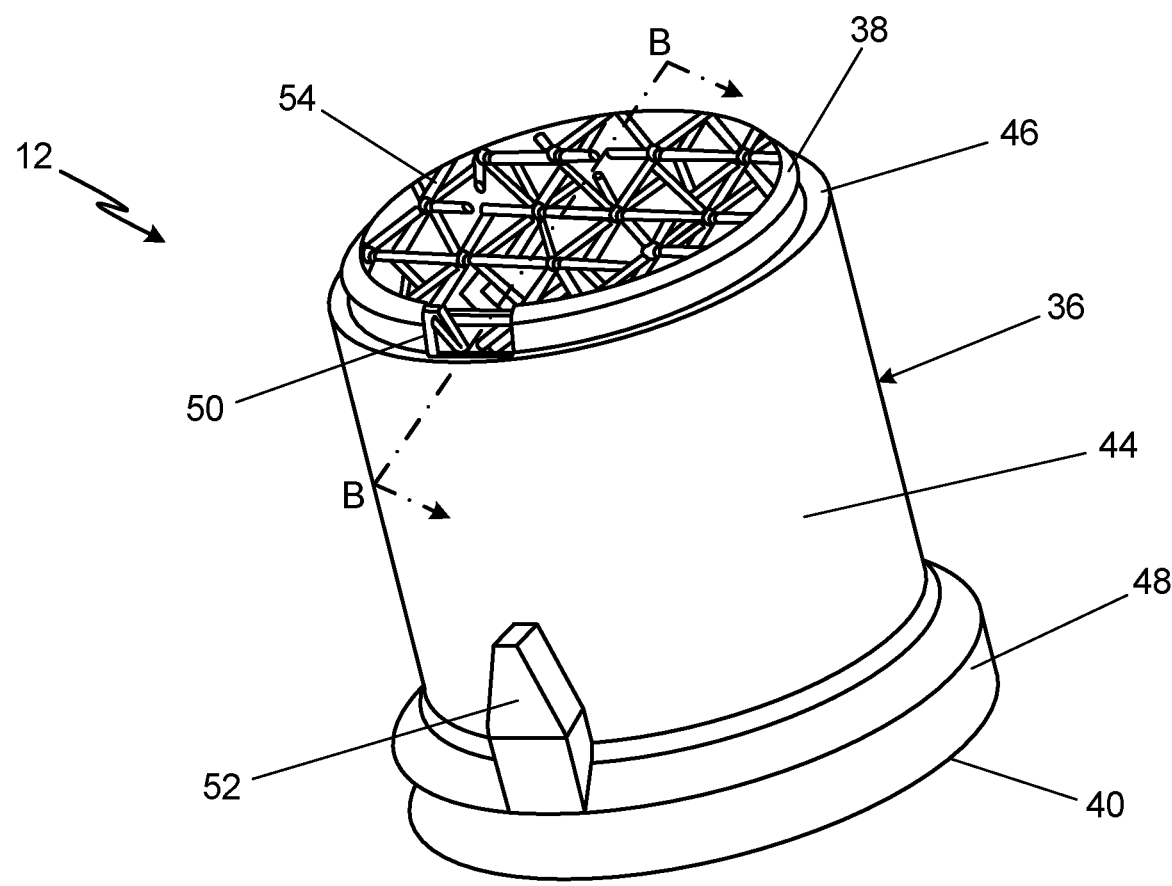
FIG. 2A is a perspective view of an exemplary housing.
Figure 2B:
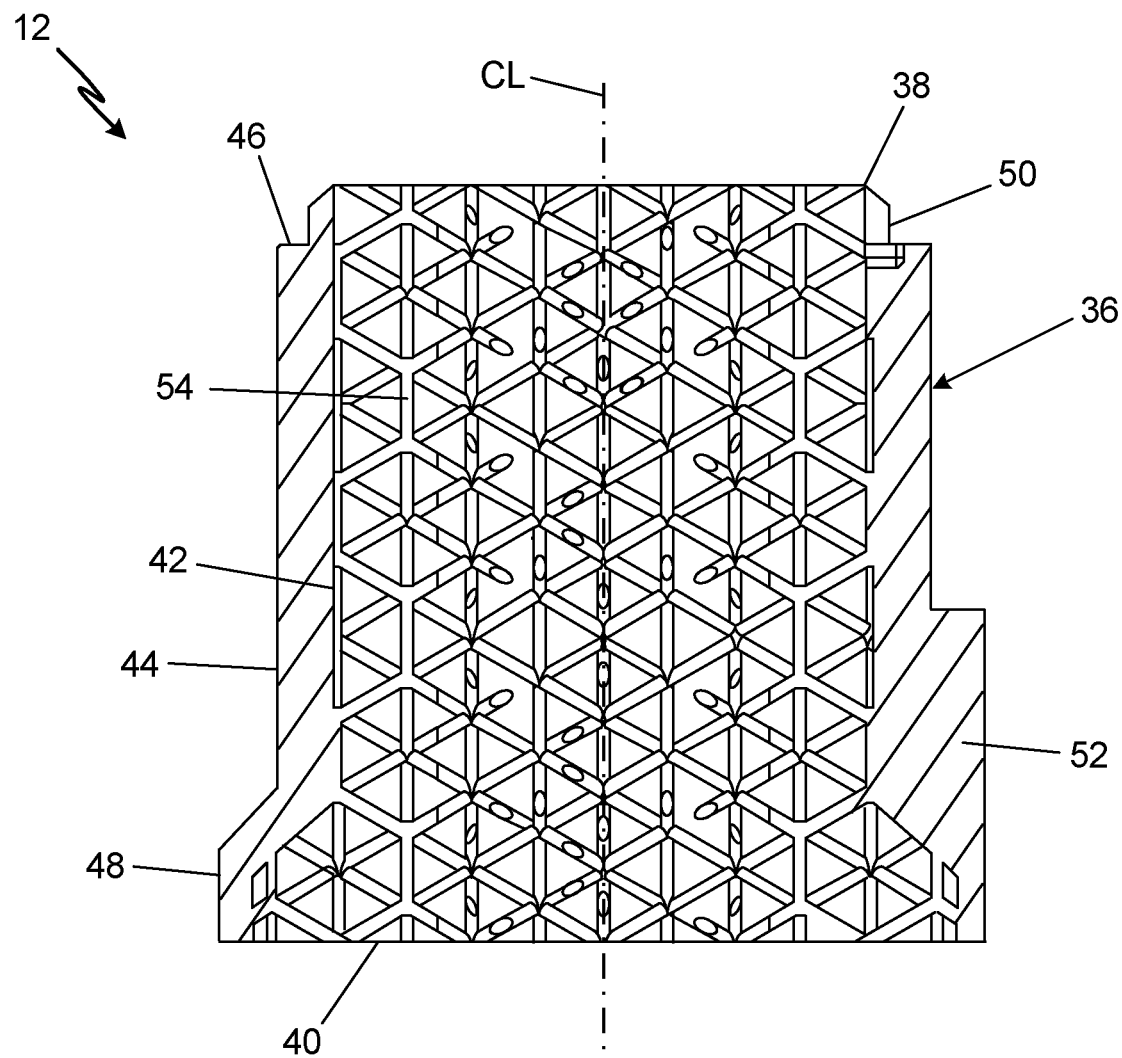
FIG. 2B is a cross-sectional view of the exemplary housing taken along Section B-B of FIG. 2A.
Figure 2C:
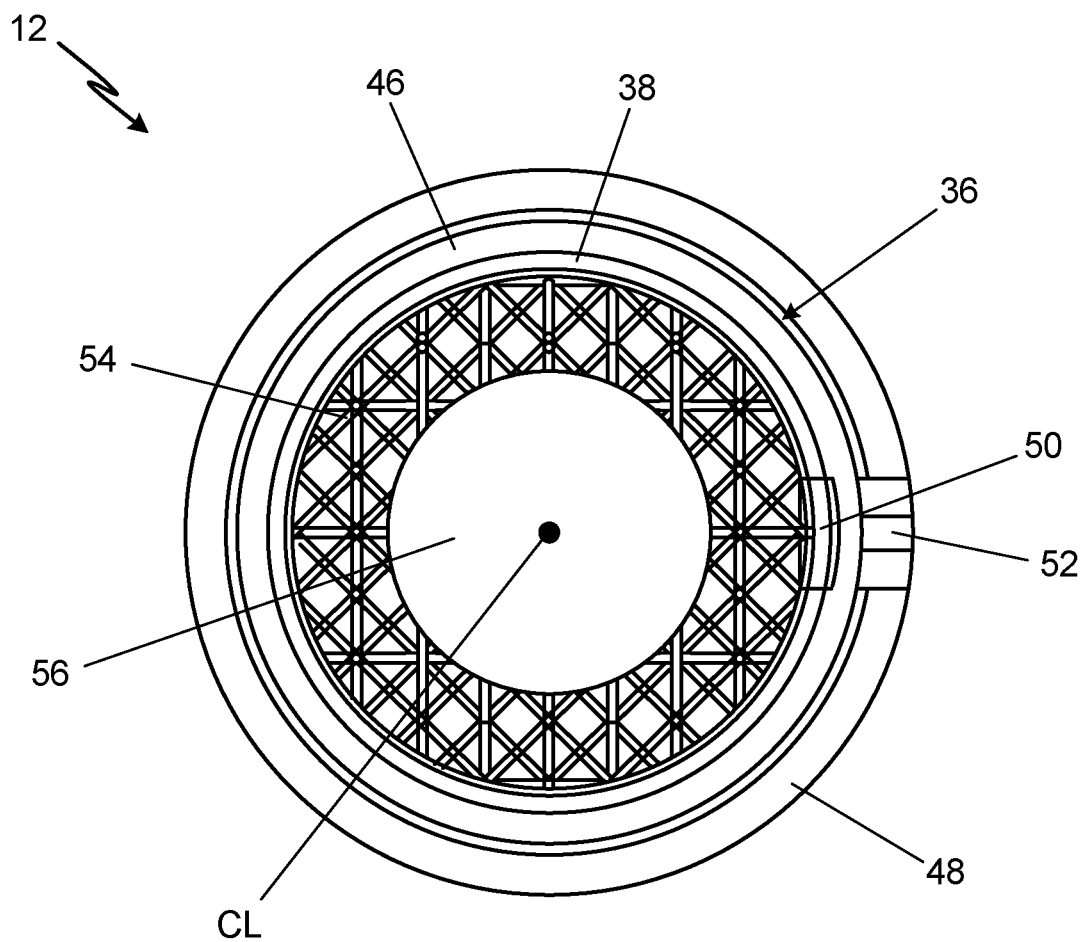
FIG. 2C is a top view of the exemplary housing.

FIG. 2A is a perspective view of housing 12 shown in FIG. 1B. FIG. 2B is a cross-sectional view of housing 12 taken along Section B-B of FIG. 2A. FIG. 2C is a top view of housing 12. FIGS. 2A-2C will be discussed together. Housing 12 includes housing body 36 including upper surface 38, lower surface 40, inner surface 42, outer surface 44, rim 46, lower body 48, first alignment feature 50, second alignment feature 52, and retention features 54. Upper surface 38 is a surface at a first distal end of housing 12 and lower surface 40 is a surface at a second distal end of housing 12, opposite first distal end. As shown best in FIG. 2B, inner surface 42 is the surface positioned within the walls constituting housing 12 and outer surface 44 is the surface positioned outside the walls constituting housing 12. In the example shown in FIGS. 2A-2C, housing 12 includes a circular cross-section in the axial direction such that housing 12 has a generally cylindrical shape. In other examples, housing 12 can have an axial cross-section of any geometrical shape.

Rim 46 is positioned adjacent upper surface 38 of housing 12 and rim 46 extends fully around a perimeter or circumference of housing 12, about central axis CL of housing 12. Rim 46 is a ledge or cutout that extends inwards from outer surface 44 towards central axis CL of housing 12. As such, an inner surface or edge of rim 46 has a smaller diameter than outer surface 44 of housing 12. Rim 46 is configured to aid in the proper positioning of housing 12 within body 14 of probe 10. Lower body 48 is positioned adjacent lower surface 40 of housing 12 and lower body 48 extends fully around outer surface 44 of housing 12, about central axis CL of housing 12. Lower body 48 is a portion of housing 12 that extends outwards from outer surface 44 of housing 12 away from central axis CL of housing 12. As such, lower body 48 has a larger diameter than outer surface 44 of housing 12. Further, in the example shown, an outer diameter of rim 46 is less than an outer diameter of lower body 48. Lower body 48 having a larger diameter than rim 46 and outer surface 44 aids in housing 12 being correctly positioned within body 14 of probe 10.

As shown best in FIGS. 2A-2B, housing body 36 also includes first alignment feature 50 and second alignment feature 52. First alignment feature 50 is positioned adjacent rim 46 of housing 12 and second alignment feature 52 is positioned adjacent lower body 48 of housing 12. First alignment feature 50 is a cutout extending through housing body 36 adjacent rim 46 and upper surface 38 of housing 12. Second alignment feature 52 is a protrusion extending outwards from outer surface 44 of housing body 36. In the example shown, first alignment feature 50 has a generally rectangular shape, but in another example first alignment feature 50 could have any geometric shape. Further, in the example shown, second alignment feature 52 is a generally triangular shaped protrusion, but in another example second alignment feature 52 could be any geometric shaped protrusion. First alignment feature 50 and second alignment feature 52 are vertically aligned with respect to a vertical plane extending from lower surface 40 of housing 12 to upper surface 38 of housing 12. First alignment feature 50 and second alignment feature 52 aid in housing 12 being correctly positioned within body 14 of probe 10. More specifically, first alignment feature 50 and second alignment feature 52 are configured to mate with mating features of body 14 of probe 10 to ensure housing 12 is oriented in the correct position while being inserted into body 14 of probe 10.

As shown in FIGS. 1B-2C, housing 12 includes retention features 54 positioned within housing 12. More specifically, housing 12 includes a plurality of retention features 54 positioned within inner surface 42 of housing body 36. Each of the plurality of retention features 54 extend from inner surface 42 of housing 12 towards central axis CL of housing 12. Further, in the example shown, the plurality of retention features 54 extend along inner surface 42 of housing 12 from upper surface 38 to lower surface 40 of housing 12. In other examples, the plurality of retention features 54 may extend along inner surface 42 of housing 12 only a partial distance from upper surface 38 to lower surface 40 of housing 12. In addition, as shown best in FIG. 2C, the plurality of retention features 54 extend fully around a circumference of inner surface 42 of housing 12.

Each of the plurality of retention features 54 extend a partial distance from inner surface 42 of housing 12 towards central axis CL of housing 12, such that aperture 56 is formed in an axial direction along central axis CL of housing 12. Aperture 56 is axially aligned with central axis CL and aperture 56 extends through housing 12 from upper surface 38 to lower surface 40 of housing 12. Referring again to FIG. 1B, aperture 56 is configured to allow a distal end of sensing probe 26, electrical wires 30, and electrical leads 32 to be positioned within and extend at least partially through aperture 56. In the example shown, aperture 56 has a circular cross-section in the axial direction of central axis CL. In other examples, aperture 56 could have any geometric shape as its cross-section in the axial direction of central axis CL.

The plurality of retention features 54 are collectively a lattice structure including one or more repeating three-dimensional open-celled structures. In other words, the plurality of retention features 54 includes a plurality of posts or extensions coupled together to form the lattice structure. The lattice structure is a repeating pattern of three-dimensional open-celled structures. Although the lattice structure shown in FIGS. 1B-2C has a specific shape and size, it is to be understood that another example lattice structure could have a different shape and size.

Each of the plurality of retention features 54 are positioned non-parallel with upper surface 38 and lower surface 40 of housing body 36. Housing 12 with the plurality of retention features 54 is manufactured using an additive manufacturing process, such as a laser powder bed fusion process. As such, housing 12 is grown in a vertical direction starting at lower surface 40 and finishing at upper surface 38. The additive manufacturing process prevents hanging horizontal posts or extensions within the lattice structure from being formed, and therefore each of the plurality of retention features 54 are positioned non-parallel with upper surface 38 and lower surface 40 of housing body 36. In some examples, housing 12 can be constructed from a metallic material. In other examples, housing 12 can be constructed from a ceramic material, a polymeric material, and/or a composite material.

Referring again to FIG. 1B, during assembly of probe 10, housing 12 is pressed into body 14, housing 12 is then welded or otherwise coupled to body 14, and electrical wires 30 are soldered or otherwise electrically coupled to electrical leads 32. Then a liquefied potting 34 is dispensed within inner surface 42 of housing 12 and the potting 34 is subsequently cured and allowed to harden within inner surface 42 of housing 12. Therefore, the cured potting 34 positioned within housing 12 becomes intertwined with the lattice structure of the plurality of retention features 54. Further, the cured potting 34 positioned within housing 12 encompasses and fully surrounds the connection point between electrical wires 30 and electrical leads 32.

During use of probe 10 on an aircraft, probe 10 is heated through heating element 24 and potting 34 will increase in temperature and expand in volume. But potting 34 being intertwined with the lattice structure of the plurality of retention features 54 holds potting 34 in place and minimizes the amount of expansion of potting 34. Further, the plurality of retention features 54 occupy a portion of the volume within inner surface 42 of housing 12 and therefore there is less total volume of potting 34, as compared to a housing without the plurality of retention features. In turn, the reduced volume of potting 34 within housing 12 further minimizes the expansion of potting 34 within housing 12, as compared to a potting within a housing without retention features.

As such, including the plurality of retention features within housing 12 hinders potting 34 from growing outside its intended adhesion area. In turn, this prevents potting 34 from expanding too much and breaking apart the electrical connection between electrical wires 30 and electrical leads 32, ensuring the electronic components within probe 10 remain functional during heating of probe 10. Protecting the electronic components within probe 10 makes probe 10 more robust and allows probe 10 to continue working accurately during heating conditions. Probe 10 including the plurality of retention features prevents damage to the electronic components within probe 10 by ensuring the heat induced on probe 10 does not have detrimental effects to the electronic components. As such, probe 10 can be heated to prevent rain and ice buildup and probe 10 will continue transferring accurate data to the pilot and the co-pilot during flight of the aircraft.

Discussion of Possible Embodiments

The following are non-exclusive descriptions of possible embodiments of the present invention.

An air data probe comprising: a body comprising an inlet fluidly coupled to an outlet; a heating element positioned within the body of the air data probe, wherein the heating element is configured to increase a temperature of the body; a sensing probe positioned within the body, wherein the sensing probe includes a sensing base coupling the sensing probe to the body; and a housing positioned within and coupled to the body, wherein the housing includes: a housing body including an upper surface, a lower surface, an inner surface, and an outer surface; and a plurality of retention features positioned within the housing body, wherein each of the plurality of retention features extend from the inner surface of the housing towards a central axis of the housing.

The air data probe of the preceding paragraph can optionally include, additionally and/or alternatively, any one or more of the following features, configurations and/or additional components:

The housing surrounds a plurality of electrical wires extending from the sensing probe, and wherein the plurality of electrical wires are electrically coupled to a plurality of electrical leads.

A connection point between the plurality of electrical wires and the plurality of electrical leads is encompassed by a potting, and wherein the potting is positioned within the inner surface of the housing and adjacent the upper surface of the housing.

The potting extends a partial distance from the upper surface of the housing towards the lower surface of the housing, and wherein the potting is constructed from a high-temperature epoxy material.

The plurality of retention features extend from the upper surface of the housing to the lower surface of the body; the plurality of retention features extend fully around a circumference of the inner surface of the housing body; and the plurality of retention features extend a partial distance from the inner surface of the housing towards a central axis of the housing, such that an aperture aligned with the central axis extends through the housing from the upper surface to the lower surface of the housing.

The plurality of retention features are collectively a lattice structure including one or more repeating three-dimensional open-celled structures, and wherein each of the plurality of retention features are positioned non-parallel with the upper surface and the lower surface of the housing body.

A potting positioned within the housing is intertwined with the lattice structure of the plurality of retention features.

A flange extending around an outer surface of the body and an electrical connector positioned at a distal end of the air data probe opposite the inlet of the air data probe.

The housing is coupled to the body through a welded connection.

The air data probe is a total air temperature probe configured to measure air temperature outside an outer skin of an aircraft.

The following are further non-exclusive descriptions of possible embodiments of the present invention.

A housing for surrounding electrical components within an air data probe configured to gather data during flight of an aircraft, the housing comprising: a housing body including an upper surface, a lower surface, an inner surface, an outer surface, a rim positioned adjacent the upper surface, and a lower body positioned adjacent the lower surface; and a plurality of retention features positioned within the housing body, wherein each of the plurality of retention features extend from the inner surface of the housing towards a central axis of the housing.

The housing of the preceding paragraph can optionally include, additionally and/or alternatively, any one or more of the following features, configurations and/or additional components:

A first alignment feature and a second alignment feature, wherein the first alignment feature is positioned adjacent the rim of the housing body, and wherein the second alignment feature is positioned adjacent the lower body of the housing body.

The first alignment feature and the second alignment feature are vertically aligned with respect to a vertical plane extending from the lower surface to the upper surface of the housing body; the first alignment feature is a cutout extending through housing body; and the second alignment feature is a protrusion extending outwards from the outer surface of the housing body.

The plurality of retention features extend from the upper surface of the housing body to the lower surface of the housing body.

The plurality of retention features extend fully around a circumference of the inner surface of the housing body.

The plurality of retention features extend a partial distance from the inner surface of the housing towards a central axis of the housing, such that an aperture aligned with the central axis extends through the housing from the upper surface to the lower surface of the housing.

The plurality of retention features are collectively a lattice structure including one or more repeating three-dimensional open-celled structures.

The plurality of retention features are positioned non-parallel with the upper surface and the lower surface of the housing body.

The housing includes a circular cross-section, such that the housing is generally cylindrical in shape.

An outer diameter of the rim is less than an outer diameter of the lower body.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air data probe comprising:
   a body comprising an inlet fluidly coupled to an outlet;
   a heating element positioned within the body of the air data probe, wherein the heating element is configured to increase a temperature of the body;
   a sensing probe positioned within the body, wherein the sensing probe includes a sensing base coupling the sensing probe to the body; and
   a housing positioned within and coupled to the body, wherein the housing includes:
      a housing body including an upper surface, a lower surface, an inner surface, and an outer surface; and
      a plurality of retention features positioned within the housing body, wherein each of the plurality of retention features extend from the inner surface of the housing towards a central axis of the housing.

2. The air data probe of claim 1, wherein the housing surrounds a plurality of electrical wires extending from the sensing probe, and wherein the plurality of electrical wires are electrically coupled to a plurality of electrical leads.

3. The air data probe of claim 2, wherein a connection point between the plurality of electrical wires and the plurality of electrical leads is encompassed by a potting, and wherein the potting is positioned within the inner surface of the housing and adjacent the upper surface of the housing.

4. The air data probe of claim 3, wherein the potting extends a partial distance from the upper surface of the housing towards the lower surface of the housing, and wherein the potting is constructed from a high-temperature epoxy material.

5. The air data probe of claim 1, wherein:
   the plurality of retention features extend from the upper surface of the housing to the lower surface of the body;
   the plurality of retention features extend fully around a circumference of the inner surface of the housing body; and
   the plurality of retention features extend a partial distance from the inner surface of the housing towards a central axis of the housing, such that an aperture aligned with the central axis extends through the housing from the upper surface to the lower surface of the housing.

6. The air data probe of claim 1, wherein the plurality of retention features are collectively a lattice structure including one or more repeating three-dimensional open-celled structures, and wherein each of the plurality of retention features are positioned non-parallel with the upper surface and the lower surface of the housing body.

7. The air data probe of claim 6, wherein a potting positioned within the housing is intertwined with the lattice structure of the plurality of retention features.

8. The air data probe of claim 1 and further comprising a flange extending around an outer surface of the body and an electrical connector positioned at a distal end of the air data probe opposite the inlet of the air data probe.

9. The air data probe of claim 1, wherein the housing is coupled to the body through a welded connection.

10. The air data probe of claim 1, wherein the air data probe is a total air temperature probe configured to measure air temperature outside an outer skin of an aircraft.

11. A housing for surrounding electrical components within an air data probe configured to gather data during flight of an aircraft, the housing comprising:
   a housing body including an upper surface, a lower surface, an inner surface, an outer surface, a rim positioned adjacent the upper surface, and a lower body positioned adjacent the lower surface;
   a plurality of retention features positioned within the housing body, wherein each of the plurality of retention features extend from the inner surface of the housing towards a central axis of the housing; and
   a first alignment feature and a second alignment feature, wherein the first alignment feature is positioned adjacent the rim of the housing body, and wherein the second alignment feature is positioned adjacent the lower body of the housing body.

12. The housing of claim 11, wherein:
   the first alignment feature and the second alignment feature are vertically aligned with respect to a vertical plane extending from the lower surface to the upper surface of the housing body;
   the first alignment feature is a cutout extending through housing body; and
   the second alignment feature is a protrusion extending outwards from the outer surface of the housing body.

13. The housing of claim 11, wherein the plurality of retention features extend from the upper surface of the housing body to the lower surface of the housing body.

14. The housing of claim 11, wherein the plurality of retention features extend fully around a circumference of the inner surface of the housing body.

15. The housing of claim 14, wherein the plurality of retention features extend a partial distance from the inner surface of the housing towards a central axis of the housing, such that an aperture aligned with the central axis extends through the housing from the upper surface to the lower surface of the housing.

16. The housing of claim 11, wherein the plurality of retention features are collectively a lattice structure including one or more repeating three-dimensional open-celled structures.

17. The housing of claim 11, wherein each of the plurality of retention features are positioned non-parallel with the upper surface and the lower surface of the housing body.

18. The housing of claim 11, wherein the housing includes a circular cross-section, such that the housing is generally cylindrical in shape.

19. The housing of claim 18, wherein an outer diameter of the rim is less than an outer diameter of the lower body.

* * * * *